United States Patent
Williams et al.

(10) Patent No.: US 11,915,045 B2
(45) Date of Patent: Feb. 27, 2024

(54) ADJUSTING STORE GATHER WINDOW DURATION IN A DATA PROCESSING SYSTEM SUPPORTING SIMULTANEOUS MULTITHREADING

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 17/351,478

(22) Filed: Jun. 18, 2021

(65) Prior Publication Data

US 2022/0405125 A1 Dec. 22, 2022

(51) Int. Cl.
| | |
|---|---|
| *G06F 9/48* | (2006.01) |
| *G06F 9/50* | (2006.01) |
| *G06F 9/54* | (2006.01) |
| *G06F 9/38* | (2018.01) |
| *G06F 9/30* | (2018.01) |

(52) U.S. Cl.
CPC ........ *G06F 9/4881* (2013.01); *G06F 9/30123* (2013.01); *G06F 9/3877* (2013.01); *G06F 9/5044* (2013.01); *G06F 9/546* (2013.01)

(58) Field of Classification Search
None
See application file for complete search history.

(56) References Cited

U.S. PATENT DOCUMENTS

| | | |
|---|---|---|
| 6,675,195 B1 | 1/2004 | Chatterjee |
| 7,284,102 B2 | 10/2007 | Guthrie et al. |
| 9,203,927 B1 | 12/2015 | Mecklenburg et al. |
| 9,547,598 B1 | 1/2017 | Karnowski et al. |

(Continued)

OTHER PUBLICATIONS

Non-Speculative Store Coalescing in Total Store Order, Ros, A. et al.; 2018.

(Continued)

*Primary Examiner* — Adam Lee
(74) *Attorney, Agent, or Firm* — Brian F. Russell; Nathan Rau (57) ABSTRACT

In at least some embodiments, a store-type operation is received and buffered within a store queue entry of a store queue associated with a cache memory of a processor core capable of executing multiple simultaneous hardware threads. A thread identifier indicating a particular hardware thread among the multiple hardware threads that issued the store-type operation is recorded. An indication of whether the store queue entry is a most recently allocated store queue entry for buffering store-type operations of the hardware thread is also maintained. While the indication indicates the store queue entry is a most recently allocated store queue entry for buffering store-type operations of the particular hardware thread, the store queue extends a duration of a store gathering window applicable to the store queue entry. For example, the duration may be extended by decreasing a rate at which the store gathering window applicable to the store queue entry ends.

16 Claims, 7 Drawing Sheets

(56) References Cited

U.S. PATENT DOCUMENTS

| | | |
|---|---|---|
| 9,582,315 B2 | 2/2017 | Busaba et al. |
| 9,632,942 B2 | 4/2017 | Guthrie et al. |
| 9,632,943 B2 | 4/2017 | Guthrie et al. |
| 9,645,937 B2 | 5/2017 | Guthrie et al. |
| 9,652,399 B2 | 5/2017 | Guthrie et al. |
| 9,910,782 B2 | 3/2018 | Guthrie et al. |
| 9,971,713 B2 | 5/2018 | Asaad et al. |
| 10,614,613 B2 | 4/2020 | Fricke et al. |
| 2006/0095691 A1* | 5/2006 | Bell .................. G06F 12/0897 712/E9.046 |
| 2007/0091921 A1* | 4/2007 | Elliot ...................... H04L 47/27 370/468 |
| 2007/0288694 A1* | 12/2007 | Ghai ..................... G06F 9/3824 711/118 |
| 2009/0138683 A1 | 5/2009 | Capps, Jr. et al. |
| 2010/0312968 A1 | 12/2010 | Hikichi |
| 2012/0179876 A1 | 7/2012 | Guthrie et al. |
| 2012/0216004 A1* | 8/2012 | Abernathy ............ G06F 9/3851 711/E12.002 |
| 2014/0173340 A1* | 6/2014 | Gutjahr .................. G06Q 10/06 714/15 |
| 2014/0259018 A1* | 9/2014 | Jain ....................... G06F 9/4881 718/102 |
| 2017/0060746 A1 | 3/2017 | Guthrie et al. |
| 2017/0060759 A1 | 3/2017 | Guthrie et al. |
| 2017/0060761 A1* | 3/2017 | Guthrie ................. G06F 9/3824 |
| 2020/0174931 A1* | 6/2020 | Williams .............. G06F 12/084 |
| 2020/0356409 A1* | 11/2020 | Williams ............ G06F 12/0811 |

OTHER PUBLICATIONS

A Lock-Free Coalescing-Capable Mechanism for Memory Management, Leite, R. et al.; 2019.
Characterizing and Enhancing Global Memory Data Coalescing on GPUs, Fauzia, N. et al.; 2015.
Avoiding Interlock and Minimizing Distortion when Gathering Operational Data from Multiple Threads in a Network of Processing Units, Anonymously; Oct. 7, 2005.
Method and Mechanism to Promote Fairness in a Resource Partitioned Multi-threaded Core, Anonymously; Oct. 14, 2011.
Automatic Coalescing of JNI Functions Using a JIT Compiler, Anonymously; May 14, 2012.

* cited by examiner

Figure 1

| V 202 | Addr 204 | Byte enable (BE) 206 | Data 208 | G 210 | D 212 | TID 214 | GCNT 216 | L 218 | Dependency matrix 220 |
|---|---|---|---|---|---|---|---|---|---|
| | | | | | | | | | |
| | | | | | | | | | |
| | | | ... | | | | | | |
| | | | | | | | | | |
| | | | | | | | | | |

ADJUSTING STORE GATHER WINDOW DURATION IN A DATA PROCESSING SYSTEM SUPPORTING SIMULTANEOUS MULTITHREADING

BACKGROUND OF THE INVENTION

The present invention relates generally to data processing and, in particular, to store gathering of store operations in a data processing system.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Lower-level caches (e.g., level two (L2) or level three (L3) caches) may be private to a particular processor core or shared by multiple processor cores.

In conventional MP computer systems, processor-issued store operations typically target only a small portion (i.e., 1 to 16 bytes) of a cache line rather than the entire cache line (e.g., 128 bytes). Consequently, an update to a cache line may include multiple individual store operations to sequential or non-sequential addresses within the cache line. In order to increase efficiency of store operations, processing units may include a coalescing store queue interposed between a processor core and a cache at which systemwide coherency is determined (e.g., the L2 cache), where the store queue provides byte-addressable storage for a number of cache lines (e.g., 8 to 16 cache lines). To reduce the number of store operations that must be performed in the cache (and potentially broadcast to other processing units), the store queue often implements "store gathering," which is the combination of multiple store operations into a single store queue entry prior to making an update to the corresponding cache line in the cache.

While generally beneficial in terms of reducing the overall number of store accesses to the cache, conventional store gathering can cause jitter in the flow of store operations as the store queue starts to fill. In addition, conventional storage gathering can negatively impact the performance of certain streaming workloads.

BRIEF SUMMARY

In at least some embodiments, improved techniques of store gathering are provided. In one example, a store-type operation is received and buffered within a store queue entry of a store queue associated with a cache memory of a processor core capable of executing multiple simultaneous hardware threads. A thread identifier indicating a particular hardware thread among the multiple hardware threads that issued the store-type operation is recorded. An indication of whether the store queue entry is a most recently allocated store queue entry for buffering store-type operations of the hardware thread is also maintained. While the indication indicates the store queue entry is a most recently allocated store queue entry for buffering store-type operations of the particular hardware thread, the store queue extends a duration of a store gathering window applicable to the store queue entry. For example, the duration may be extended by decreasing a rate at which the store gathering window applicable to the store queue entry ends.

DETAILED DESCRIPTION

Figure 1:
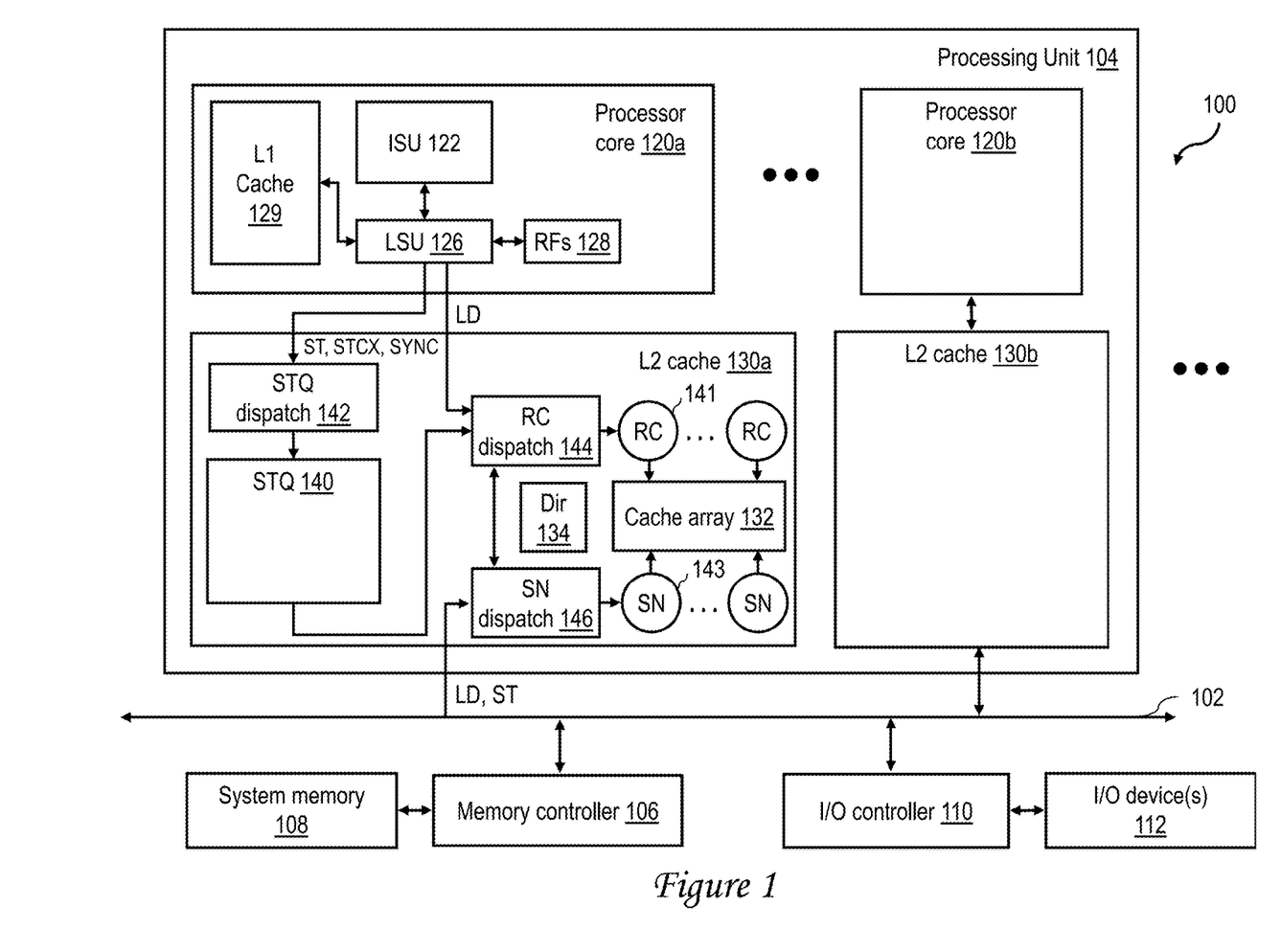
FIG. 1 is a high-level block diagram of an exemplary data processing system in accordance with one embodiment.

With reference now to the figures and in particular, with reference to FIG. 1, there is illustrated a multiprocessor (MP) data processing system 100 in accordance with one embodiment. MP data processing system 100 includes one or more (and preferably a plurality of) processing units 104, each of which may be realized as a single integrated circuit chip. Processing units 104 are coupled for communication by an interconnect 102, which may be implemented, for example, with one or more buses and/or switches.

Interconnect 102 is further communicatively coupled to a memory controller 106, which provides an interface to a system memory 108, and also to an input/output (I/O) controller 110, which provides an interface to one or more I/O devices 112. Data and instructions residing in system memory 108 can generally be accessed, cached and modified by a processor core in any processing unit 104 within data processing system 100. System memory 108 thus forms the lowest level of memory in the distributed shared memory system of data processing system 100.

Each processing unit 104 includes one or more processor cores 120 (e.g., processor cores 120*a*, 120*b*) for processing instructions and data. In at least some embodiments, each processor core 120 is a simultaneous multithreading (SMT) core capable of independently executing multiple hardware threads of execution simultaneously. Each such hardware thread is identified by a thread identifier (TID). As depicted, each processor core 120 includes an instruction sequencing unit (ISU) 122 that fetches and orders instructions for execution and one or more execution units, such as load-store unit (LSU) 126, for executing instructions. The instructions executed by LSU 126 include memory access instructions that request load or store access to a memory block in the distributed shared memory system. Portions of memory blocks obtained from the distributed shared memory system by load accesses are buffered in one or more register files (RFs) 128, and portions of memory blocks updated by store accesses are written to the distributed shared memory system from the one or more register files 128.

The operation of each processor core 120 is supported by a multi-level volatile memory hierarchy having at its lowest level shared system memory 108, and at its upper levels, one or more levels of cache memory, which in the illustrative embodiment include a store-through level one (L1) cache 129 within and private to each processor core 120, and a respective store-in level two (L2) cache 130 (e.g., L2 caches 130*a*, 130*b*) for each processor core 120*a*, 120*b*. In the embodiment illustrated, L1 and L2 caches are addressed by translated "real" addresses as opposed to untranslated "virtual" or "effective" addresses. Those skilled in the art will recognize that caches may alternatively or additionally be accessed using effective or virtual addresses as well. Although the illustrated cache hierarchies include only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache. The length of the cache lines held in the various levels of the cache hierarchy may vary between embodiments, but in at least one embodiment is 128 bytes.

In operation, when a hardware thread under execution by a processor core 120 includes a memory access instruction requesting a specified memory access operation to be performed, LSU 126 executes the memory access instruction to determine the target address (e.g., an effective address that is translated to a real target address) of the memory access request. L1 cache 129 is accessed based on the real target address. Assuming the indicated memory access cannot be satisfied solely by reference to L1 cache 129, LSU 126 then transmits to its affiliated L2 cache 130 a memory access operation, which includes, for example, at least a transaction type (ttype) (e.g., load, store, etc.), the thread identifier (TID) of the hardware thread that issued the memory access operation, the target real address to be accessed, and if a store operation, the store data with which the specified memory location is to be updated.

Still referring to FIG. 1, L2 cache 130 includes a cache array 132 and a directory 134 of the contents of cache array 132. Assuming cache array 132 and directory 134 are set-associative as is conventional, memory locations in system memory 108 are mapped to particular congruence classes within cache array 132 utilizing predetermined index bits within the system memory (real) addresses. The particular memory blocks stored within the cache lines of cache array 132 are recorded in cache directory 134, which contains one directory entry for each cache line.

L2 cache 130 also includes a coalescing store queue (STQ) 140 interposed between processor core 120 and cache array 132. STQ 140 includes multiple entries for buffering store-type and barrier (e.g., SYNC) operations to be performed with respect to the distributed shared memory system. Store-type and barrier operations are loaded into STQ 140 by STQ dispatch logic 142. L2 cache 130 additionally includes multiple (e.g., 16) Read-Claim (RC) machines 140 for independently and concurrently servicing load-type and store-type operations originating from the affiliated processor core 120. In addition, L2 cache 130 includes multiple snoop (SN) machines 142 that can independently and concurrently handle remote memory access requests of other processor cores 120 that are snooped from interconnect 102. Store-type operations buffered within STQ 140 and load-type operations received from the affiliated processor core 120 are dispatched to RC machines 141 for processing in accordance with a prioritization and scheduling determined by RC dispatch logic 144. Similarly, memory access requests snooped from interconnect 102 are dispatched to SN machines 143 for processing in accordance with a prioritization and scheduling determined by SN dispatch logic 146.

Those skilled in the art will appreciate that MP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Figure 2:
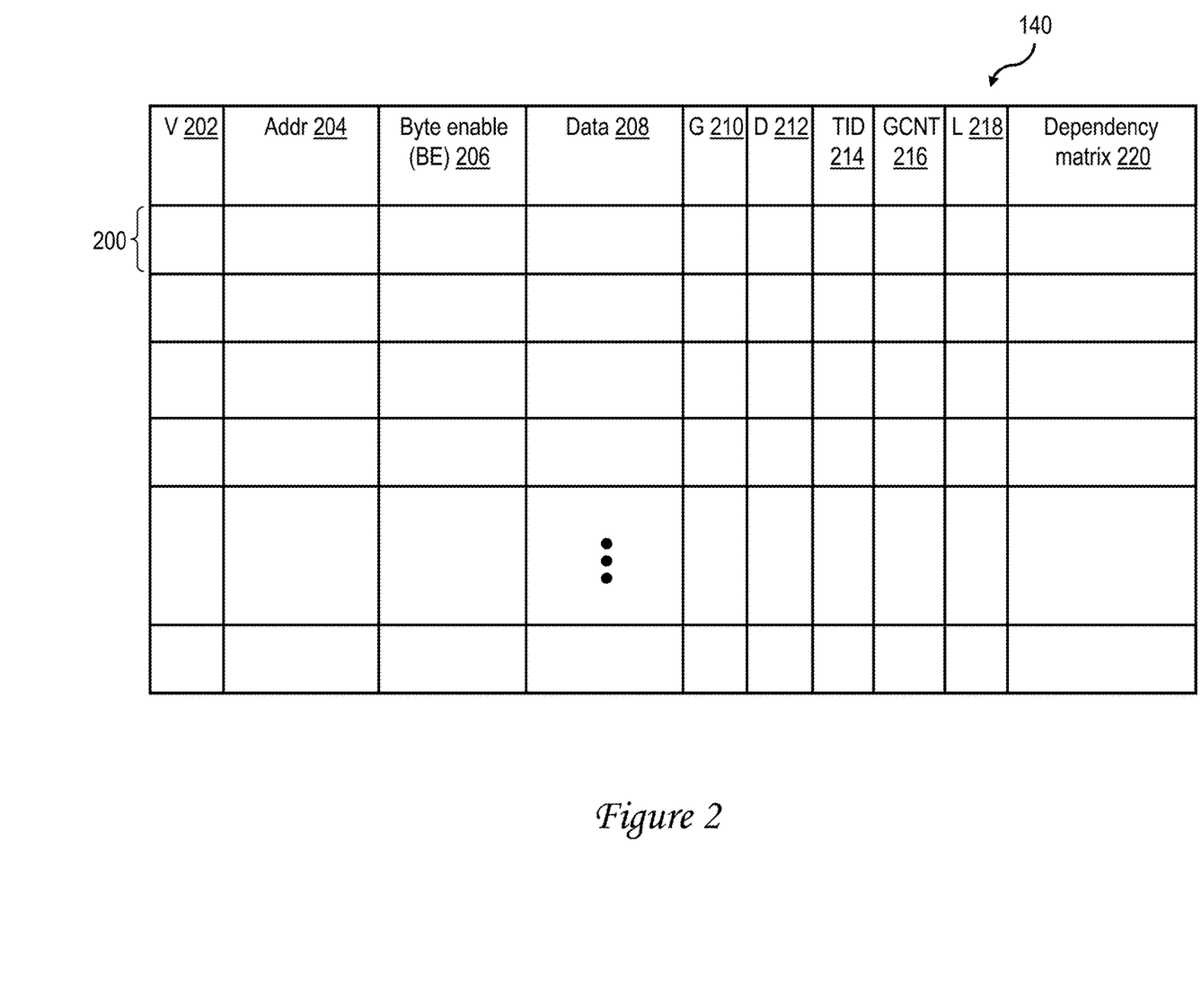
FIG. 2 is a more detailed block diagram of an exemplary store queue in accordance with one embodiment.

Referring now to FIG. 2, there is depicted an exemplary store queue (STQ) 140 in accordance with one embodiment. As illustrated, STQ 140 includes multiple STQ entries 200, each including multiple fields. These fields include a valid field 202 indicating whether the contents of the STQ entry 200 are valid, an address field 204 for storing at least a portion of a real address of a cache line to which a store operation is to be performed, a byte enable (BE) field 206 for indicating which byte(s) of the cache line are to be updated with store data, a data field 208 for buffering store data to be written to the cache line identified by the real address indicated by address field 204, and a dependency matrix field 220 that tracks data dependencies between entries 200.

In addition, each STQ entry 200 includes a number of control fields, including a gatherable (G) field 210 indicating whether or not additional store operations can be gathered within the STQ entry 200, a dispatchable (D) field 212 indicating whether or not the store operation specified by STQ entry 200 may be dispatched by RC dispatch logic 144 to an RC machine 141 for service, a thread identifier (TID) field 214 identifying the hardware thread that issued the operation(s) recorded in the STQ entry 200, a latest (L) field 218 indicating whether or not the STQ entry 200 buffers a latest-in-time gatherable store operation received in STQ 140 from the hardware thread identified by TID field 214, and a gather counter (GCNT) field 216 utilized to track a duration of a store gather window of the STQ entry 200. In one example, GCNT field 216 is implemented as a saturating counter to prevent possibly undesirable behavior arising from counter overflow or underflow.

Figure 3:
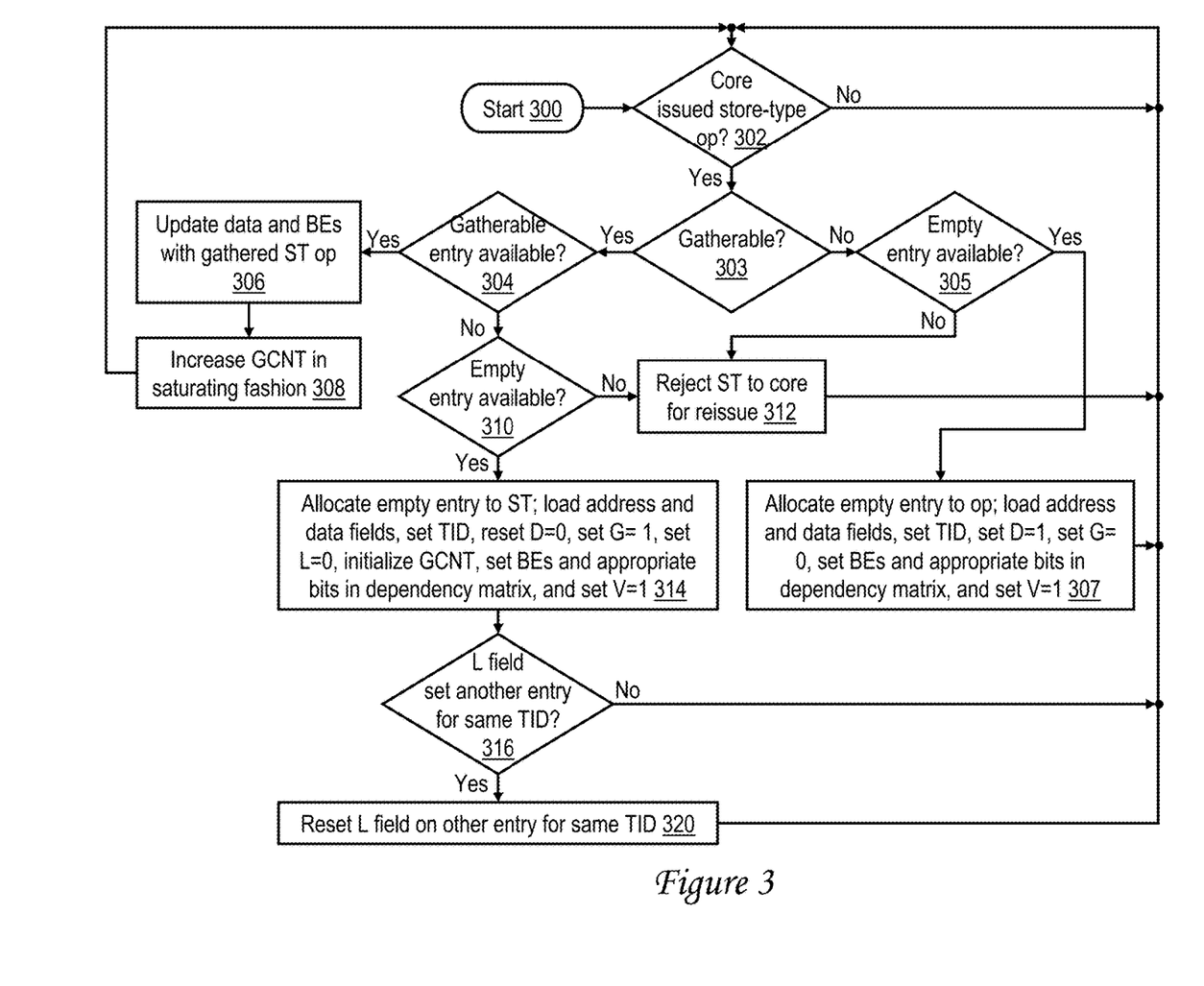
FIG. 3 is a high-level logical flowchart of an exemplary process for dispatching store operations to a store queue in accordance with one embodiment.

With reference now to FIG. 3, there is illustrated a high-level logical flowchart of an exemplary process of dispatching store-type operations into STQ 140 in accordance with one embodiment. The illustrated process can be performed, for example, by integrated circuitry within STQ dispatch logic 142.

The process begins at block 300 and proceeds to block 302, which depicts STQ dispatch logic 142 monitoring for receipt of a store-type operation (e.g., a store (ST) operation store-conditional (STCX) operation, or other storage-modifying operation) from its affiliated processor core 120. If no store-type operation has been received, the process iterates at block 302. In response to receipt of a store-type operation from the affiliated processor core 120, STQ dispatch logic 142 determines at block 303 whether or not the store-type operation received at block 302 is gatherable. As one example, a store-conditional (STCX) operation is not gatherable due to the conditional nature of the indicated storage update. In response to a determination at block 303 that the store-type operation is gatherable, the process passes to block 304, which is described below. If, however, STQ dispatch 142 determines at block 303 that the store-type operation is not gatherable, STQ dispatch logic 142 determines at block 305 whether or not an empty STQ entry 200 (i.e., one having a reset valid field 202) is available in STQ 140. In response to a negative determination at block 305, meaning STQ 140 is full, STQ dispatch logic 142 rejects the store-type operation received at block 302 by transmitting a message (or signal) to the affiliated processor core 120 (block 312). The processor core 120 can thereafter reissue the store-type operation to STQ dispatch logic 142. Following block 312, the process of FIG. 3 returns to block 302.

Returning to block 305, in response to a determination that an empty STQ entry 200 is available, the process proceeds to block 307, which illustrates STQ dispatch logic 142 allocating the empty STQ entry 200 to the store-type operation received at block 302. At block 305, STQ dispatch logic 142 loads the address field 204 and data field 208 with the real address and store data specified by the store-type operation, sets BE field 206 to identify the byte(s) modified by store data, and sets TID field 214 to indicate which hardware thread issued the store-type operation. In addition, STQ dispatch logic 142 resets gatherable (G) field 210 (e.g., to 0) to indicate the STQ entry 200 is not gatherable and sets dispatchable field 212 (e.g., to 1) to indicate the STQ entry 200 is dispatchable. In addition, STQ dispatch logic 142 sets the appropriate bits, if any, in dependency matrix field 220 to indicate any dependency between the new entry 200 and other valid STQ entries 200 of STQ 140. A new STQ entry 200 is dependent on another STQ entry 200 if, among other things, the store-type operation buffered in the new STQ entry 200 accesses the same real address as the other STQ entry 200 or must be synchronized with the store-type operation of the other STQ entry 200 due to the ordering requirements of a barrier operation (e.g., SYNC). STQ dispatch logic 142 then sets valid (V) field 202 (e.g., to 1) to indicate the contents of the STQ entry 200 are valid. Thereafter, the process returns to block 302.

Referring now to block 304, STQ dispatch logic 142 determines whether or not a gatherable STQ entry 200 is available in STQ 140, that is, whether STQ 140 contains a STQ entry 200 for which valid field 202 is set (e.g., to 1), the address field 204 contains a real address that matches that of the received store operation, and gatherable (G) field 210 is set (e.g., to 1), and the TID specified by the store-type operation matches that specified in the TID field 214 of the STQ entry 200. In at least one embodiment, STQ dispatch logic 142 requires a TID match to permit store gathering because, among other reasons, the enforcement of barrier (e.g., SYNC) operations in STQ 140 is greatly simplified by prohibiting store gathering across threads. In response to a determination at block 304 that STQ 140 has a gatherable STQ entry 200 available, STQ dispatch logic 142 gathers the received store-type operation into the gatherable STQ entry 200 by updating byte enable field 206 and data field 208 to reflect the bytes updated by the store data of the received store-type operation (block 306). In addition, STQ dispatch logic 142 increases the count value in GCNT field 216 to potentially increase a duration of the store gather window applicable to the STQ entry 200 (block 308). As noted, the count value in GCNT field 216 is preferably increased in a saturating fashion to avoid counter overflow. The process returns from block 308 to block 302, which has been described.

Returning to block 304, in response to a determination that no gatherable STQ entry 200 is available in STQ 140 for the received store-type operation, STQ dispatch logic 142 determines at block 310 whether or not an empty STQ entry 200 (i.e., one having a reset valid field 202) is available in STQ 140. In response to a negative determination at block 310, meaning STQ 140 is full, STQ dispatch logic 142 rejects the store-type operation received at block 302 by transmitting a message (or signal) to the affiliated processor core 120 (block 312). The processor core 120 can thereafter reissue the store-type operation to STQ dispatch logic 142. Following block 312, the process of FIG. 3 returns to block 302.

Returning to block 310, in response to STQ dispatch logic 142 determining that an empty STQ entry 200 is available in STQ 140, the process proceeds to block 314, which illustrates STQ dispatch logic 142 allocating the empty STQ entry 200 to the store-type operation received at block 302. At block 314, STQ dispatch logic 142 loads the address field 204 and data field 208 with the real address and store data specified by the store-type operation, sets BE field 206 to identify the byte(s) modified by store data, and sets TID field 214 to indicate which hardware thread issued the store-type operation. In addition, STQ dispatch logic 142 sets gatherable (G) field 210 (e.g., to 1) to indicate the STQ entry 200 is gatherable, resets dispatchable field 212 (e.g., to 0) to indicate the STQ entry 200 is not dispatchable, initializes GCNT field 216 to an initial count value, sets latest (L) field 218 (e.g., to 1) to indicate STQ entry 200 is the most recently allocated STQ entry 200 for the TID, and sets the appropriate bits, if any, in dependency matrix field 220 to indicate any dependency between the new entry 200 and other valid STQ entries 200 of STQ 140. A new STQ entry 200 is dependent on another STQ entry 200 if, among other things, the store-type operation buffered in the new STQ entry 200 accesses the same real address as the other STQ entry 200 or must be synchronized with the store-type operation of the other STQ entry 200 due to the ordering requirements of a barrier operation (e.g., SYNC). STQ dispatch logic 142 then sets valid (V) field 202 (e.g., to 1) to indicate the contents of the STQ entry 200 are valid.

The process proceeds from block 314 to block 316, which illustrates STQ dispatch logic 142 determining whether or not the latest (L) field 218 of another STQ entry 200 allocated to one or more previously received store-type operations of the same hardware thread is set. If not, the process returns from block 316 to block 302. However, in response to determining at block 316 that another STQ entry 200 for the same TID has its L field 218 set, STQ dispatch logic 142 resets the L field 218 (e.g., to 0) of the other STQ entry 200 to indicate that it is no longer the STQ entry 200 most recently allocated to gather store-type operations for the given TID (block 320). Following block 320, the process of FIG. 3 returns to block 302, which has been described.

Figure 4:
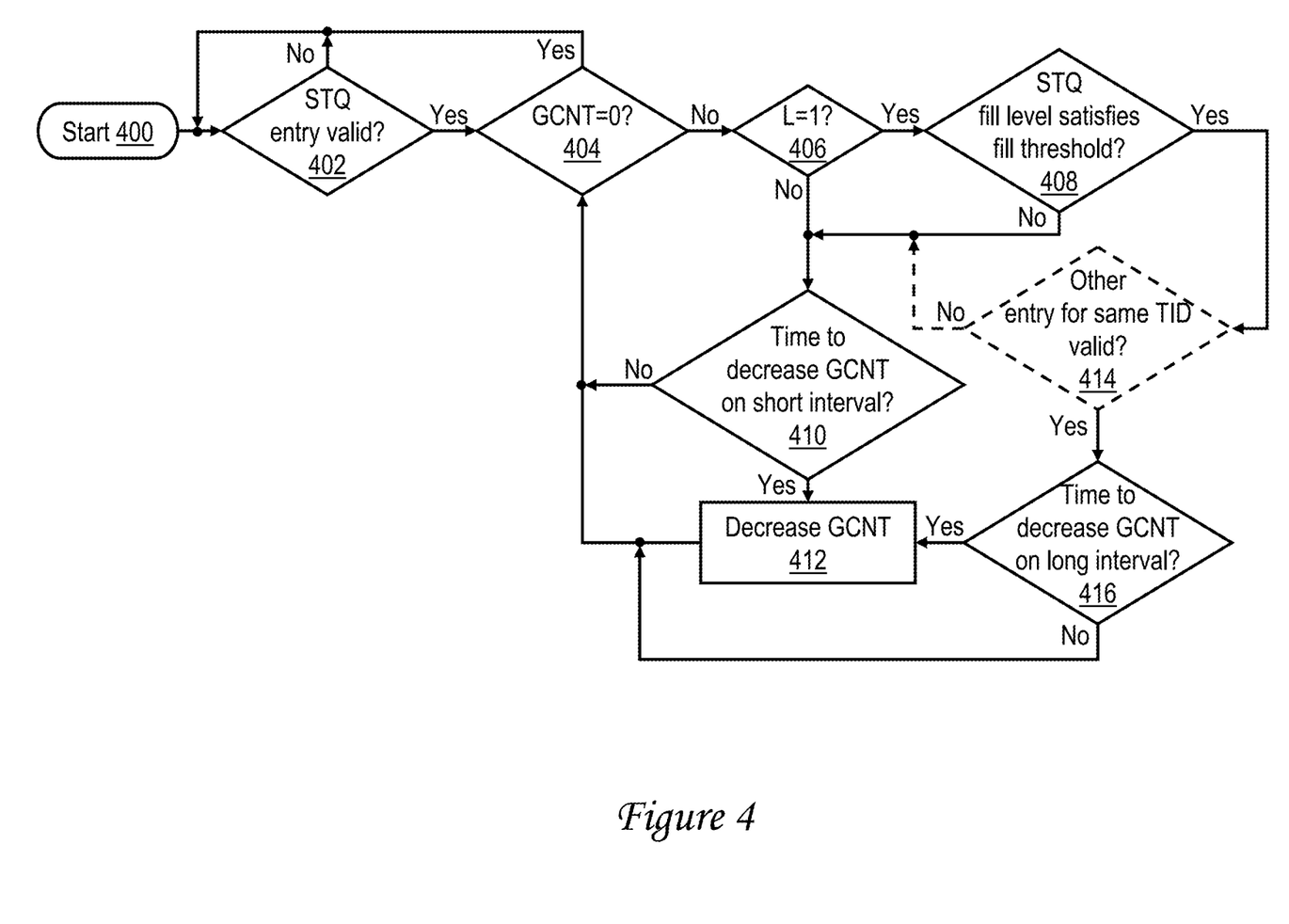
FIG. 4 is a high-level logical flowchart of an exemplary process for managing a duration of a store gathering window in accordance with one embodiment.

Referring now to FIG. 4, there is depicted a high-level logical flowchart of an exemplary process for managing a duration of a store gathering window applicable to a particular STQ entry 200 in accordance with one embodiment. Instances of the process depicted in FIG. 4 are performed by STQ 140 in parallel for all store queue entries 200. The illustrated process can be performed, for example, by integrated circuitry within STQ 140.

The process of FIG. 4 begins at block 400 and then proceeds to block 402, which illustrates STQ 140 determining whether or not the particular STQ entry 200 is valid (e.g., valid field 202 is set to 1). In response to a determination at block 402 that the particular STQ entry 200 is not valid, the process returns to block 402 and proceeds in an iterative fashion. If, however, STQ 140 determines at block 402 that the particular STQ entry 200 is valid, the process proceeds to block 404, which depicts STQ 140 determining whether or not GCNT field 216 of the particular STQ entry 200 has a terminal count value (e.g., a value of 0 for a down counter). If so, the maximum duration of the store gather window of the STQ entry 200 has been reached, and the process of FIG. 4 returns to block 402, which has been described.

Returning to block 404, in response to STQ 140 determining that GCNT field 216 does not have the terminal count value, STQ 140 determines at block 406 if latest (L) field 218 is still set (e.g., to 1). If so, the process passes to block 408 and following blocks, which are described below. If, however, STQ 140 determines at block 406 that latest (L) field 218 is not still set, meaning that another newer STQ entry 200 has been allocated to store-type operations associated with the same TID as the particular STQ entry 200 managed by the instance of the process of FIG. 4, STQ 140 determines at block 410 whether or not it is time to decrease the count value maintained in GCNT field 216 on a short interval, such as once every 8 clock cycles. If STQ 140 determines at block 410 that it is not time to decrease the count value of GCNT field 216, the process returns to block 404 without adjusting the count value of GCNT field 216. If, however, STQ 140 makes an affirmative determination at block 410, STQ 140 decreases the count value in GCNT field 216 (e.g., by decrementing the count value by 1), as shown at block 412. Thereafter, the process returns to block 404.

Referring now to block 408, if the particular STQ entry 200 is still marked as the latest STQ entry 200 for a given TID, STQ 140 additionally determines whether a fill level of STQ 140, for example, as denominated by an absolute number or percentage of STQ entries 200 for which valid field 202 is set, satisfies a fill threshold (e.g., is greater than, or alternatively, is greater than or equal to the fill threshold). The fill threshold may be, for example, a majority fraction of the STQ entries 200 (e.g., two-thirds or three-fourths) up to and including allocation of all of the STQ entries 200. The fill threshold is utilized to detect dynamic operating conditions, such as the presence of a streaming workload, under which it can be desirable to extend the duration of the store gather window applicable to the particular STQ entry 200 in order to provide additional opportunities for store gathering. In response to a negative determination at block 408, the process of FIG. 4 passes to block 410, which has been described.

In some embodiments, if STQ 140 makes an affirmative determination at block 408, the process passes directly to block 416, which is described below. However, in at least some embodiments, STQ 140 may further qualify the extension of the duration of the store queue window with one or more additional tests, as shown, for example, at block 414. In the illustrated example, STQ 140 optionally determines at block 414 whether or not the particular STQ entry 200 is the only currently valid STQ entry 200 associated with the TID specified in TID field 214. If not, meaning at least one older valid STQ entry 200 associated with the same TID is present in STQ 140, STQ 140 continues decreasing the count value in GCNT field 216 on the short time interval, as shown at block 410-412. Otherwise, STQ 140 decreases the count value in GCNT field 216 on a long time interval. For example, STQ 140 determines at block 416 whether or not it is not time to decrease the count value of GCNT field 216 on a long time interval, for example, once each 1024 or 2048 clock cycles. If not, the process returns from block 416 to block 404 without adjusting the count value of GCNT field 216. If, however, STQ 140 makes an affirmative determination at block 416, STQ 140 decreases the count value in GCNT field 216 (e.g., by decrementing the count value by 1), as shown at block 412. Thereafter, the process of FIG. 4 returns to block 404.

Thus, in the process of FIG. 4, based on detection of a high fill level, STQ 140 can extend the duration of the store gathering window applicable to the STQ entry 200 that was most recently allocated to buffer store-type operation(s) of a given hardware thread. Although in some embodiments, the extension of the duration of the store gathering window can be accomplished in other equivalent ways (e.g., by incrementing GCNT field 216), in the disclosed embodiment, the extension of the duration of the store gathering window is achieved by decreasing a rate at which the store gathering window ends (i.e., by varying the rate of decrementing GCNT field 216). Experimentally, the extension of store gathering window durations as disclosed has been found to reduce store pipe jitter and to improve performance of streaming workloads.

Figure 5:
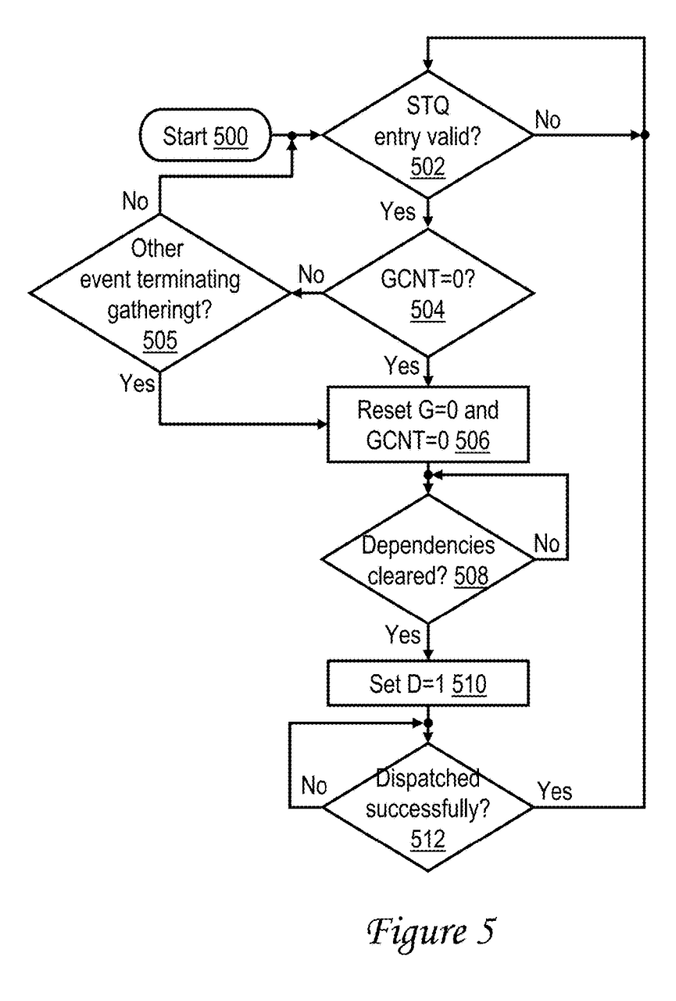
FIG. 5 is a high-level logical flowchart of an exemplary process for processing an entry of a store queue in accordance with one embodiment.

With reference now to FIG. 5, there is illustrated a high-level logical flowchart of an exemplary process for processing a particular STQ entry 200 in STQ 140 in accordance with one embodiment. Instances of the process depicted in FIG. 5 are performed by STQ 140 in parallel for all STQ entries 200. The illustrated process can be performed, for example, by integrated circuitry within STQ 140.

The process of FIG. 5 begins at block 500 and proceeds to block 502, which illustrates STQ 140 determining whether or not the particular STQ entry 200 is valid (e.g., valid field 202 is set to 1). In response to a determination at block 502 that the particular STQ entry 200 is not valid, the process returns to block 502 and proceeds in an iterative fashion. If, however, STQ 140 determines at block 502 that the particular STQ entry 200 is valid, STQ 140 determines whether or not store gathering for the entry has finished. For example, STQ 140 can determine at block 504 whether or not the count value in GCNT field 216 has reached its terminal value (e.g., 0) In addition, STQ 140 may determine at block 505 whether or not some other event that terminates store gathering for the particular STQ entry 200 has occurred. For example, at block 505, STQ 140 may determine whether or not any of the following events has been detected: (1) BE field 206 indicates a full cache line of data has been written into the particular STQ entry 200, (2) a barrier (e.g., SYNC) operation has been received into STQ 140, (3) L2 cache 130 has issued a load-type operation specifying a target address matching the address in address field 204, (4) L2 cache 130 has received a store-type operation (e.g., a store-conditional operation) from the same TID and specifying target address matching the address in address field 204 that is nevertheless not gatherable into the particular STQ entry 200, or (5) L2 cache 130 has received a store-type operation from a different TID that specifies a target address matching the address in address field 204. In response to a negative determination at block 505, the process of FIG. 5 returns to block 502. In response, however, to a determination at block 504 or block 505 that store gathering for the particular STQ entry 200 has been terminated, the process passes to block 506.

At block 506, STQ 140 resets gatherable field 210 (e.g., to 0) and, if needed, updates GCNT field 216 to the terminal value (e.g., to 0) to indicate that the particular STQ entry 200 is non-gatherable. At block 508, STQ 140 also determines whether or not dependency matrix field 220 indicates that all the dependencies, if any, associated with the particular STQ entry 200 have been cleared (e.g., by the other STQ entry or entries 200 on which the subject STQ entry 200 was dependent being dispatched from STQ 140). If not, the process iterates at block 508. However, in response to a determination that dependency matrix field 220 indicates that all dependencies, if any, of the subject STQ entry 200 have been cleared, STQ 140 marks the STQ entry 200 as available for dispatch, for example, by setting dispatchable field 212 to 1 (block 510).

The process proceeds from block 510 to block 512, which illustrates STQ 140 determining whether the store operation buffered in the STQ entry 200 has been successfully dispatched, for example, by the process of FIG. 6, which is described below. In at least some embodiments, the successful dispatch of the store operation is signaled to STQ 140 by an RC machine 141 sending a "dispatch complete" signal to STQ 140 in response to receipt of a store operation to be serviced. In response to STQ 140 determining that the store operation buffered in the particular STQ entry 200 has not yet been successfully dispatched, the process iterates at block 512. However, in response to a determination at block 512 that the store operation buffered in the particular STQ entry 200 has been successfully dispatched, the process of FIG. 5 returns to block 502 and continues in an iterative fashion.

Figure 6:
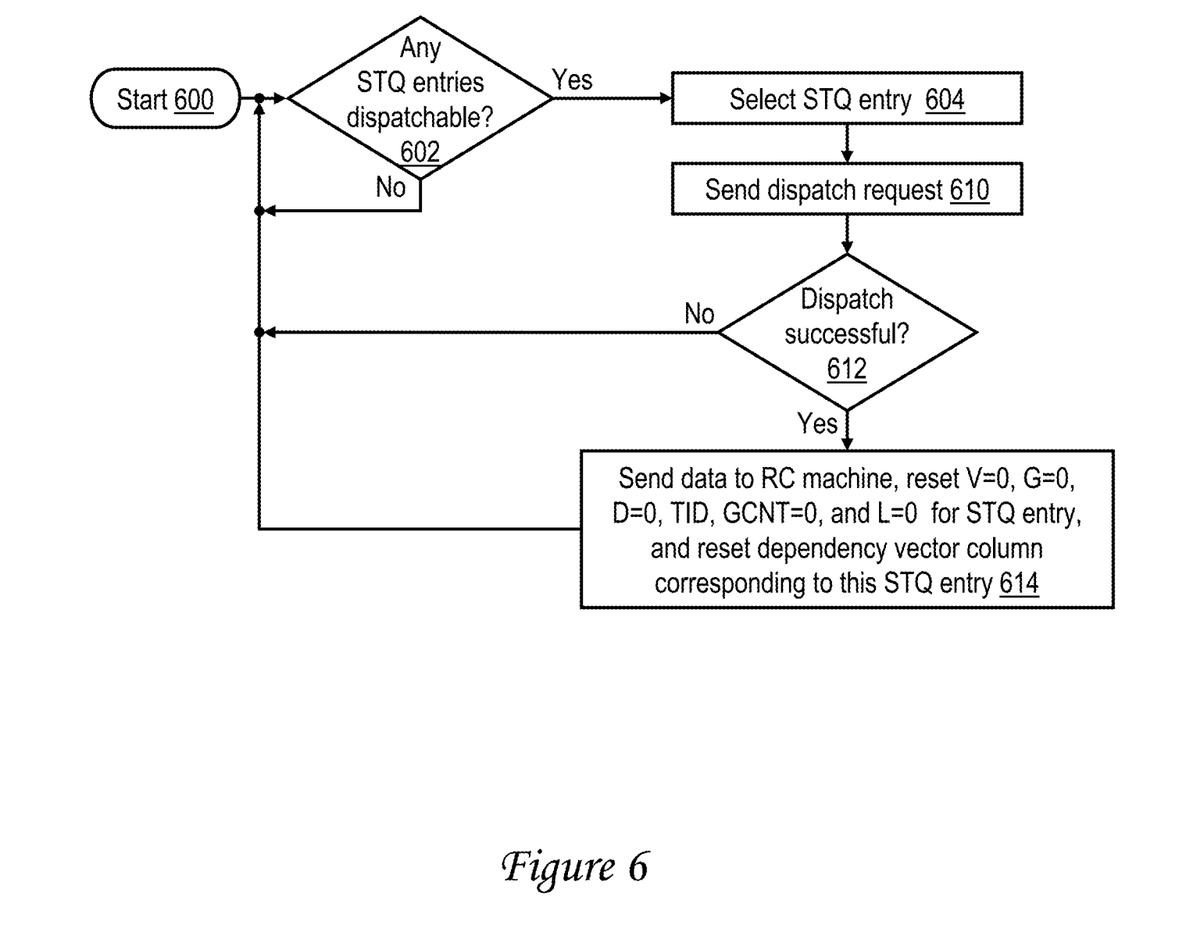
FIG. 6 is a high-level logical flowchart of an exemplary process for dispatching an entry of a store queue for service by a cache in accordance with one embodiment.

With reference now to FIG. 6, there is illustrated a high-level logical flowchart of an exemplary process for dispatching a STQ entry 200 of STQ 140 for service by a cache in accordance with one embodiment. The illustrated process can be performed, for example, by integrated circuitry within RC dispatch logic 144.

The process of FIG. 6 begins at block 600 and continues to block 602, which illustrates RC dispatch logic 144 determining whether or not any STQ entry or entries 200 are eligible for dispatch (e.g., have valid field 202 and dispatchable (D) field 212 both set to 1). If not, the process of FIG. 6 iterates at block 602. However, in response to a determination at block 602 that at least one STQ entry 200 in STQ 140 is presently available for dispatch, RC dispatch logic 144 selects one of the dispatchable STQ entries 200 for dispatch, as shown at block 604. The selection can be made from among the dispatchable STQ entries 200, for example, based on pseudo-random selection, round robin selection, the relative ages of the STQ entries 200, the TIDs associated with the dispatchable STQ entries 200, relative priority levels (if applicable) of the store operations, and/or another selection methodology. The process then proceeds to block 610.

Block 610 depicts RC dispatch logic 144 sending to an RC machine 141 a dispatch request including the real address of the store operation from the selected STQ entry 200. At block 612, RC dispatch logic 144 determines whether or not dispatch of the store operation from the selected STQ entry 200 was successful, for example, as indicated by a "dispatch complete" signal received from the RC machine 141. If not, the process returns to step 602 and proceeds in an iterative fashion. If, however, RC dispatch logic 144 determines that the dispatch of the store operation from the STQ entry 200 was successful, RC dispatch logic 144 sends the store data buffered in data field 208 of the selected entry 200 to the RC machine 141 and prepares the STQ entry 200 for reuse (block 614). For example, RC dispatch logic 144 marks the selected STQ entry 200 as invalid by resetting valid field 202 (e.g., to 0), resets (e.g., to 0) gatherable (G) field 210, dispatchable (D) field 212 and latest (L) field 218, and clears TB) field 214 and GCNT field 216. In addition, STQ 140 resets a column in dependency vector field 220 corresponding to the particular STQ entry 200, thus freeing any dependency of other STQ entries 200 on the particular STQ entry 200. The steps illustrated at block 614 of FIG. 6 result in a determination of successful dispatch at block 512 of FIG. 5. Following block 614, the process of FIG. 6 returns to step 602 and proceeds in an iterative fashion.

In response to receipt of the store operation, the RC machine 141 to which the store operation is dispatched performs the store operation by obtaining, if necessary, write permission, obtaining, if necessary, a copy of the target cache line, and updating the target cache line in cache array 132 with the store data of the store operation.

Figure 7:
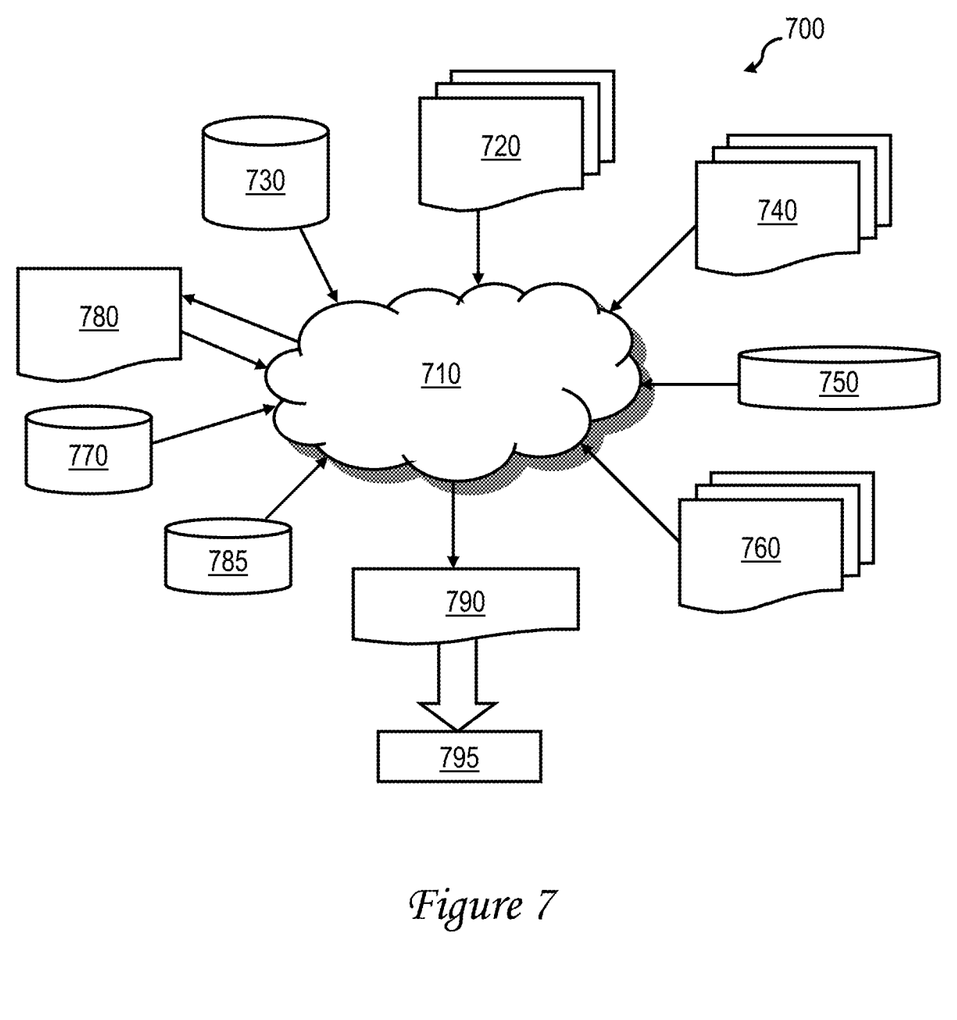
FIG. 7 is a data flow diagram illustrating a design process.

With reference now to FIG. 7, there is depicted a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of the design structures and/or devices described above and shown herein. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 1020 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown herein. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown herein to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 790 may comprise a compiled, executable HDL simulation model that functionally simulates the devices shown herein.

Design structure 790 may also employ a data format used for the exchange of layout data of integrated circuits and/or symbolic data format (e.g., information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 790 may then proceed to a stage 795 where, for example, design structure 790: proceeds to tape-out, is released to manufacturing, is released to a mask house, is sent to another design house, is sent back to the customer, etc.

As has been described, in at least one embodiment, a store-type operation is received and buffered within a store queue entry of a store queue associated with a cache memory of a processor core capable of executing multiple simultaneous hardware threads. A thread identifier indicating a particular hardware thread among the multiple hardware threads that issued the store-type operation is recorded. An indication of whether the store queue entry is a most recently allocated store queue entry for buffering store-type operations of the hardware thread is also maintained. While the indication indicates the store queue entry is a most recently allocated store queue entry for buffering store-type operations of the particular hardware thread, the store queue extends a duration of a store gathering window applicable to the store queue entry. For example, the duration may be extended by decreasing a rate at which the store gathering window applicable to the store queue entry ends.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes signal media.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved, it will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof. The term "exemplary" means one example of a step or feature, not necessarily the best or only step or feature. As employed herein, a "storage device" is specifically defined to include only statutory articles of manufacture and to exclude signal media per se, transitory propagating signals per se, and energy per se.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of data processing in a data processing system, the method comprising:
    receiving and buffering a store-type operation within a store queue entry of a store queue wherein the store queue is disposed within a cache memory of a processor core capable of executing multiple simultaneous hardware threads, wherein the store queue has a plurality of store queue entries including the store queue entry;
    storing, in the store queue entry, a thread identifier indicating a particular hardware thread among the multiple hardware threads that issued the store-type operation;
    storing, in the store queue entry, a first indication that the store queue entry is a most recently allocated store queue entry for buffering store-type operations of the particular hardware thread, wherein an extension of a duration of a store gathering window applicable to the store queue entry is based on the first indication;
    storing, in the store queue entry, a second different indication that the store queue entry is no longer the most recently allocated store queue entry for buffering the store-type operations of the particular hardware thread, wherein an accelerated rate at which the store gathering window applicable to the store queue entry ends is based on the second indication;
    performing store gathering within the store queue entry only for the particular hardware thread while prohibiting store gathering, within the store queue entry, for the other multiple threads during the store gathering window applicable to the store queue entry;
    dispatching the store-type operation from the store queue entry for service by the cache memory after the store gathering window ends; and
    updating the cache memory with the store data of the store-type operation.

2. The method of claim 1, wherein the extension of the duration is based on a decreasing rate at which the store gathering window applicable to the store queue entry ends.

3. The method of claim 1, wherein extending the extension of the duration is based on a a fill level of the store queue satisfying a fill threshold.

4. The method of claim 1, wherein a remaining portion of the duration of the store gathering window applicable to the store queue entry is based on a counter.

5. A method of data processing in a data processing system, the method comprising:
    receiving and buffering a store-type operation within a store queue entry of a store queue wherein the store queue is disposed within a cache memory of a processor core capable of executing multiple simultaneous hardware threads, wherein the store queue has a plurality of store queue entries including the store queue entry;
    storing, in the store queue entry, a thread identifier indicating a particular hardware thread among the multiple hardware threads that issued the store-type operation;
    storing, in the store queue entry, a first indication that the store queue entry is a most recently allocated store queue entry for buffering store-type operations of the particular hardware thread, wherein an extension of a duration of a store gathering window applicable to the store queue entry is based on the first indication and the store queue entry being the only one of the plurality of store queue entries currently allocated to buffer store-type operations of the particular hardware thread; and
    performing store gathering within the store queue entry only for the particular hardware thread while prohibiting store gathering, within the store queue entry, for the other multiple threads during the store gathering window applicable to the store queue entry;
    dispatching the store-type operation from the store queue entry for service by the cache memory after the store gathering window ends; and
    updating the cache memory with the store data of the store-type operation.

6. A processing unit, comprising:
    a processor core capable of executing multiple simultaneous hardware threads;
    a cache memory including a cache array; and
    a store queue, disposed in the cache memory, for buffering store operations to be serviced by the cache array, wherein the store queue includes a plurality of store queue entries and is configured to perform:
        receiving and buffering a store-type operation within a store queue entry among the plurality of store queue entries;
        storing, in the store queue entry, a thread identifier indicating a particular hardware thread among the multiple hardware threads that issued the store-type operation;
        storing, in the store queue entry, a first indication that the store queue entry is a most recently allocated store queue entry for buffering store-type operations of the particular hardware thread, wherein an extension of a duration of a store gathering window applicable to the store queue entry is based on the first indication;

storing, in the store queue entry, a second different indication that the store queue entry is no longer the most recently allocated store queue entry for buffering the store-type operations of the particular hardware thread, wherein an accelerated rate at which the store gathering window applicable to the store queue entry ends is based on the second indication;

performing store gathering within the store queue entry only for the particular hardware thread while prohibiting store gathering, within the store queue entry, for the other multiple threads during the store gathering window applicable to the store queue entry;

dispatching the store-type operation from the store queue entry for service by the cache memory after the store gathering window ends; and updating the cache memory with the store data of the store-type operation.

7. The processing unit of claim 6, wherein the extension of the duration is based on a decreasing rate at which the store gathering window applicable to the store queue entry ends.

8. The processing unit of claim 6, wherein the extension of the duration is based on a a fill level of the store queue satisfying a fill threshold.

9. The processing unit of claim 6, wherein a remaining portion of the duration of the store gathering window applicable to the store queue entry is based on a counter.

10. A data processing system, comprising:
a plurality of processing units in accordance with claim 6; and
an interconnect fabric coupling the plurality of processing units.

11. A processing unit, comprising:
a processor core capable of executing multiple simultaneous hardware threads;
a cache memory including a cache array: and
a store queue, disposed in the cache memory, for buffering store operations to be serviced by the cache array, wherein the store queue includes a plurality of store queue entries and is configured to perform:
receiving and buffering a store-type operation within a store queue entry among the plurality of store queue entries;
storing, in the store queue entry, a thread identifier indicating a particular hardware thread among the multiple hardware threads that issued the store-type operation;
storing, in the store queue entry, a first indication that the store queue entry is a most recently allocated store queue entry for buffering store-type operations of the particular hardware thread, wherein an extension of a duration of a store gathering window applicable to the store queue entry is based on the first indication and the store queue entry being the only one of the plurality of store queue entries currently allocated to buffer store-type operations of the particular hardware thread; and
performing store gathering within the store queue entry only for the particular hardware thread while prohibiting store gathering, within the store queue, for the other multiple threads during the store gathering window applicable to the store queue entry;

dispatching the store-type operation from the store queue entry for service by the cache memory after the store gathering window ends; and updating the cache memory with the store data of the store-type operation.

12. A design structure tangibly embodied in a non-transitory computer readable storage medium for designing, manufacturing, or testing an integrated circuit, the design structure comprising:
a processing unit, including:
a processor core capable of executing multiple simultaneous hardware threads;
a cache memory including a cache array; and
a store queue, disposed in the cache memory, for buffering store operations to be serviced by the cache array, wherein the store queue includes a plurality of store queue entries and is configured to perform:
receiving and buffering a store-type operation within a store queue entry among the plurality of store queue entries;
storing, in the store queue entry, a thread identifier indicating a particular hardware thread among the multiple hardware threads that issued the store-type operation;
storing, in the store queue entry, a first indication that the store queue entry is a most recently allocated store queue entry for buffering store-type operations of the particular hardware thread, wherein an extension of a duration of a store gathering window applicable to the store queue entry is based on the first indication;
storing, in the store queue entry, a second different indication that the store queue entry is no longer the most recently allocated store queue entry for buffering the store-type operations of the particular hardware thread, wherein an accelerated rate at which the store gathering window applicable to the store queue entry ends is based on the second indication;
performing store gathering within the store queue entry only for the particular hardware thread while prohibiting store gathering, within the store queue entry, for the other multiple threads during the store gathering window applicable to the store queue entry;
dispatching the store-type operation from the store queue entry for service by the cache memory after the store gathering window ends; and
updating the cache memory with the store data of the store-type operation.

13. The design structure of claim 12, wherein the extension of the duration is based on a decreasing rate at which the store gathering window applicable to the store queue entry ends.

14. The design structure of claim 12, wherein the extension of the duration is based on a fill level of the store queue satisfying a fill threshold.

15. The design structure of claim 12, wherein a remaining portion of the duration of the store gathering window applicable to the store queue entry is based on a counter.

16. A design structure of tangibly embodied in a non-transitory computer readable storage medium for designing, manufacturing, or testing an integrated circuit, the design structure comprising:
a processing unit, including:
a processor core capable of executing multiple simultaneous hardware threads;

a cache memory including a cache array; and
a store queue, disposed in the cache memory, for buffering store operations to be serviced by the cache array, wherein the store queue includes a plurality of store queue entries and is configured to perform:
  receiving and buffering a store-type operation within a store queue entry among the plurality of store queue entries;
  storing, in the store queue entry, a thread identifier indicating a particular hardware thread among the multiple hardware threads that issued the store-type operation;
  storing, in the store queue entry, a first indication that the store queue entry is a most recently allocated store queue entry for buffering store-type operations of the particular hardware thread, wherein an extension of a duration of a store gathering window applicable to the store queue entry is based on the first indication and the store queue entry being the only one of the plurality of store queue entries currently allocated to buffer store-type operations of the particular hardware thread; and
  performing store gathering within the store queue entry only for the particular hardware thread while prohibiting store gathering, within the store queue entry, for the other multiple threads during the store gathering window applicable to the store queue entry;
  dispatching the store-type operation from the store queue entry for service by the cache memory after the store gathering window ends; and
  updating the cache memory with the store data of the store-type operation.

* * * * *